United States Patent [19]

Ichikawa

[11] Patent Number: 4,568,240

[45] Date of Patent: Feb. 4, 1986

[54] METHOD AND APPARATUS FOR CONTROLLING MULTISTAGE HYDRAULIC MACHINE

[75] Inventor: Kentaro Ichikawa, Chigasaki, Japan

[73] Assignee: Tokyo Shibaura Denki Kabushiki Kaisha, Kawasaki, Japan

[21] Appl. No.: 594,123

[22] Filed: Mar. 28, 1984

[30] Foreign Application Priority Data

Mar. 30, 1983 [JP] Japan .................................. 58-54470

[51] Int. Cl.⁴ ............................................. F01D 17/04
[52] U.S. Cl. ......................................... 415/1; 415/14; 415/26; 415/500
[58] Field of Search .................. 415/1, 14, 15, 17, 30, 415/26, 500, 36

[56] References Cited

U.S. PATENT DOCUMENTS

| | | | |
|---|---|---|---|
| 4,472,103 | 9/1984 | Yamagata et al. | 415/500 X |
| 4,487,549 | 12/1984 | Takakusagi et al. | 415/500 X |
| 4,502,831 | 3/1985 | Sato et al. | 415/17 X |

Primary Examiner—Edward K. Look
Assistant Examiner—Joseph M. Pitko
Attorney, Agent, or Firm—Schwartz, Jeffery, Schwaab, Mack, Blumenthal & Evans

[57] ABSTRACT

A method and apparatus for controlling a multistage hydraulic machine in which respective pressure stages are connected in series through runners and return passages and the highest and lowest pressure stages are provided with movable guide vanes, are organized such that the guide vanes of either one of the two pressure stages are controlled in accordance with the load of the hydraulic machine, while the guide vanes of the other one of the two pressure stages are controlled in accordance with a relation defined by the load of the lowest pressure stage and the load of the hydraulic machine.

34 Claims, 6 Drawing Figures

METHOD AND APPARATUS FOR CONTROLLING MULTISTAGE HYDRAULIC MACHINE

BACKGROUND OF THE INVENTION

This invention relates to a method and apparatus for controlling the operation of a multistage hydraulic machine, and more particularly to a method and apparatus for controlling and adjusting a load, in a normal operating condition, of a multistage hydraulic machine in which all pressure stages are interconnected through return passages and the highest and lowest pressure stages are provided with movable guide vanes.

In a known hydraulic machine, the operation or running condition thereof is controlled by adjusting water flow-rate passing through a runner, with adjustment being made on the guide vanes provided around the runner or on an inlet valve provided at an inlet portion of the hydraulic machine. Such a method as described above may be applied to a multistage hydraulic machine in which respective pressure stages are provided with runners and connected together through return passages. However, the control of water flowing conditions at the respective stages by guide vanes provided around the runners of the stages is extremely difficult because of constructional limitations in providing movable guide vanes around the runners of the corresponding stages and in controlling the opening and closing of the guide vanes by a guide vane control mechanism connected to the guide vanes, thus entailing a problem in practical use of the multistage hydraulic machine.

In another controlling method, only stationary guide vanes having a constant degree of opening are provided around the runner of each pressure stage, and the adjustment of the water flow rate and the machine operation control are performed by open-close control of the inlet valve provided at an inlet portion of the hydraulic machine. With this method, however, the water flow condition at the periphery of the runner of each stage cannot be properly adjusted, so that in low and high flow-rate ranges apart from design points, hydraulic performance of the hydraulic machine tends to be deteriorated.

In order to obviate the defects or problems described above, there has been proposed a method for controlling the operation of a multistage hydraulic machine, in which movable guide vanes are provided only for the highest pressure stage and the flow amount of water can be adjusted by regulating the degress of opening of the movable guide vanes. Also, with this method, problems such as vibrations, noises and cavitation tend to occur in case of low flow-rate operation of the hydraulic machine.

It has been considered to construct a multistage hydraulic machine provided with movable guide vanes for the highest and lowest pressure stages for improving the load controlling operation of the machine under a normal operation condition. In this case, the construction of the part forming flow passage is complicated in comparison with that of a hydraulic machine of a single pressure stage, and furthermore the openings of the two sets of movable guide vanes in the highest and lowest pressure stages must be controlled accurately. In case where the movable guide vanes are not controlled accurately, head-share, that is, the ratio of the water pressure or head supported by a specific pressure stage to the water pressure or head supported by the entire stages of the machine, becomes unequal by the pressure stages, thus lowering the hydraulic performance and creating excessive pressure rise or vibrations, noises and cavitation particularly in the lowest pressure stage.

In other words, the technique for controlling multistage hydraulic machines which are provided with movable guide vanes in the highest pressure stage and lowest pressure stage, has not yet been well established, and any appropriate operation control method in which the load of the multistage hydraulic machine is accurately controlled under a normal operating condition, has not yet been proposed.

SUMMARY OF THE INVENTION

An object of this invention is to provide a method and apparatus for controlling the operation of a multistage hydraulic machine in which load adjustment or regulation under a normal operation condition can be performed by controlling degrees of openings of movable guide vanes provided in the highest and lowest pressure stages.

Another object of the invention is to provide a method and apparatus for controlling the operation of a multistage hydraulic machine in which head distribution among the plurality of pressure stages is made even, and the hydraulic performance of the machine can be substantially improved.

According to one aspect of the present invention, there is provided a method for controlling the operation of a multistage hydraulic machine under a normal operation condition, in which a runner is provided in each pressure stage, two adjacent pressure stages are interconnected through a return passage, and movable guide vanes are provided in the highest and lowest pressure stages, the degrees of openings of the guide vanes being variable, the method comprising the steps of controlling the degree of opening of the movable guide vanes provided in either one of the highest and lowest pressure stages in accordance with control instructions related to the output of a generator-motor coupled to the hydraulic machine, while controlling the degree of opening of the movable guide vanes provided in the other pressure stage in accordance with control instructions related to a ratio of the output of the lowest pressure stage to an over-all output of the hydraulic machine, or a ratio of the output of the lowest pressure stage to the output of the highest pressure stage, or a difference between the two outputs.

According to another aspect of the invention, there is provided an apparatus for controlling the operation of a multistage hydraulic machine under a normal operating condition, comprising means for controlling movable guide vanes provided in either one of the highest and lowest pressure stages based on an operational output of an generator-motor coupled with the hydraulic machine, and means for controlling movable guide vanes in the other one of the two pressure stages based on a ratio of the output of the lowest pressure stage to the over-all output of the hydraulic machine, or a ratio of the output of the lowest pressure stage to the output of the highest pressure stage, or a difference between the two outputs.

DESCRIPTION OF THE PREFERRED EMBODIMENTS

Figure 1:
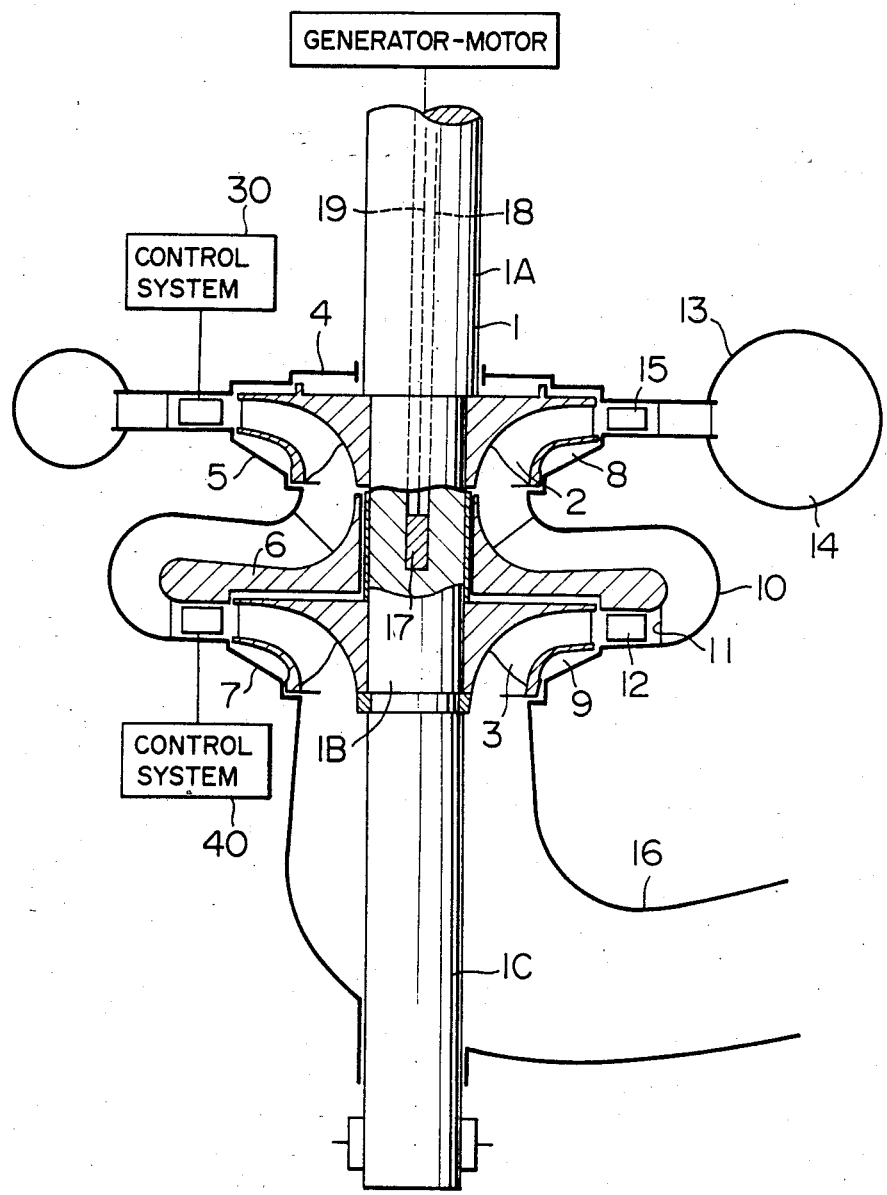
FIG. 1 is a vertical sectional view showing a two stage pump-turbine of Francis type controlled according to a preferred embodiment of the invention.

A preferred embodiment of the controlling method and apparatus for a multistage hydraulic machine will now be described in detail with reference to FIG. 1 showing a Francis-type two stage pump-turbine as a typical example of a multistage hydraulic machine.

As shown in FIG. 1, a runner 2 provided in the high pressure stage and a runner 3 provided in the low pressure stage are mounted on a turbine shaft 1 in an axially spaced-apart relation. The runner 2 is covered with upper and lower covers 4 and 5 to thereby define a runner chamber 8 of the high pressure stage, while the runner 3 is covered with an upper cover 6 forming one part of a return passage as described below, and a lower cover 7 to thereby define another runner chamber 9 of the low pressure stage. The runner chambers 8 and 9 are interconnected through a return passage 10 in which a return blade 11 and movable guide vanes 12 for the low pressure stage, the opening of which is adjustable, are provided.

The exemplary embodiment is described herein in connection with a two-stage pump-turbine. Application of the teachings of the invention to pump-turbines having more than two stages will be straightforward to one of ordinary skill in the art. Also, it should be noted that although the appended claims delineate the stages in superlatives rather than comparatives (highest and lowest rather than higher and lower), this language is intended to be generic to all pump-turbines having more than one stage, i.e., it is intended to encompass two-stage turbines.

A spiral casing 13 is arranged outside of the runner chamber 8. In a flow passage that communicates a spiral chamber 14 defined in the spiral casing 13 with the runner chamber 8 are provided movable guide vanes 15 for the high pressure stage, the degree of opening of which is variable. Although it is not illustrated, the inlet side of the spiral casing 13 is connected through an inlet valve with a penstock that extends to an upper reservoir.

The runner chamber 9 of the lower pressure stage is connected through a draft tube 16 to a tailrace (not shown) that extends toward a lower reservoir The turbine shaft 1 comprises an upper portion 1A, intermediate portion 1B and a lower portion 1C. According to the present invention, a strain gauge 17 is provided in the intermediate portion 1B for detecting the torsional load of the lower pressure stage. The output electric signal delivered from the strain gauge 17 is sent out through a cable 19 extending along an internal hole 18 of the turbine shaft 1 to a control unit which is described hereinafter in detail. The upper end of the turbine shaft 1 of the pump-turbine is coupled with a generator-motor.

A preferred embodiment for controlling the pump-turbine will now be described with reference to FIGS. 1, 2 and 3.

Figure 2:
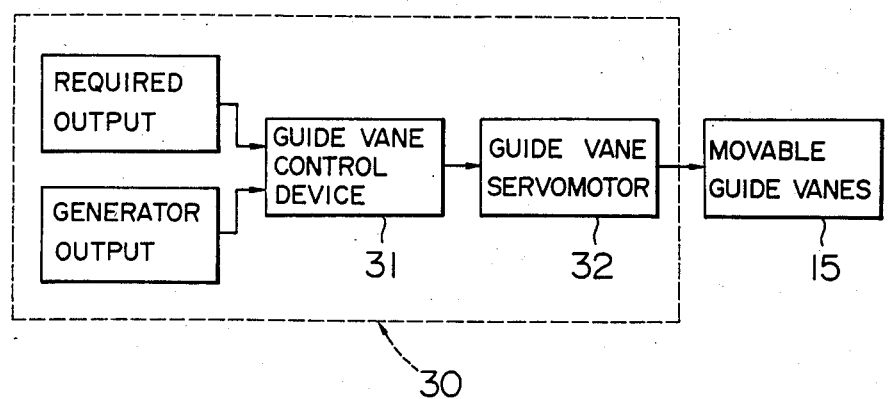
FIGS. 2 and 3 are block diagrams showing examples of control devices used in the present invention.

In case where the load of the pump-turbine shown in FIG. 1 is controlled in a normal operating condition under a predetermined pressure head, a reference signal corresponding to a desired output of the pump-turbine and a signal representing the actual output of the generator-motor coupled with the pump-turbine are both applied to input terminals of a guide vane control device 31 in a control device 30 shown in FIG. 2 which is provided for controling the guide vanes of the higher pressure stage, for example.

More specifically, when the actual output of the generator-motor exceeds the reference output, the guide-vane control device 31 controls the guide vanes 15 in a closing direction through a guide vane servomotor 32, while when the actual output of the generator-motor is less than the reference output, the device 31 controls the guide vanes 15 in an opening direction.

As a result of the opening control of the guide vanes 15, the head share between the higher and lower pressure stage runners varies. That is, when the opening of the guide vanes 15 of the higher pressure stage becomes larger than that of the guide vanes 12 of the lower pressure stage, the head share of the high pressure stage runner decreases in comparison with that of the low pressure stage runner. Conversely, when the opening of the guide vanes 15 becomes smaller, the head share of the high pressure stage runner increases.

Figure 3:
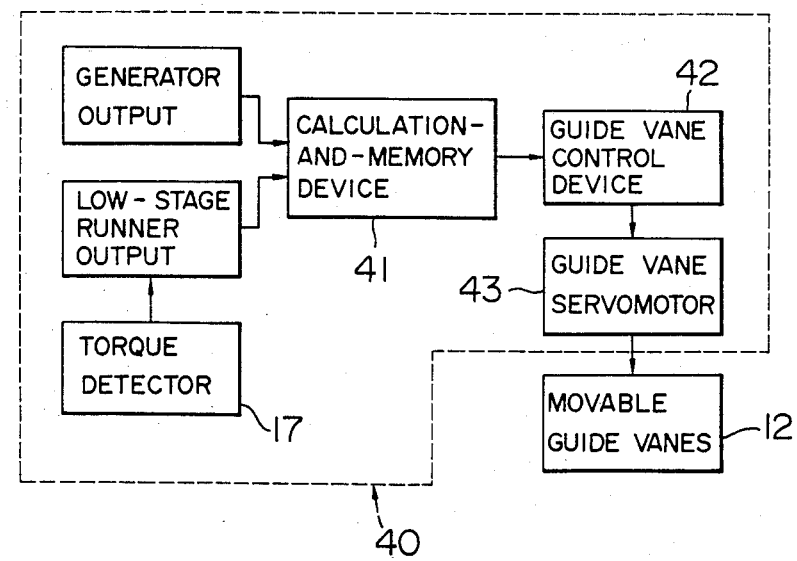
Figure 4:
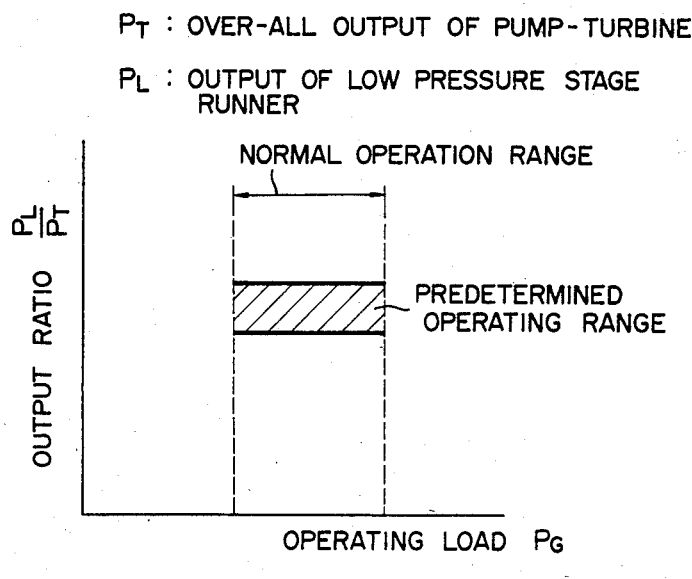
FIG. 4 is a diagram showing an operating range which is defined by a ratio of the output of the lower pressure stage to the total output of the pump-turbine under a normal operating condition.

On the other hand, the control of the guide vanes 12 of the low pressure stage, for example, is carried out by another control device 40 shown in FIG. 3. The output signal from the strain gauge 17 provided in the intermediate portion 1B of the turbine shaft 1 is converted into a value indicative of the output of the lower stage runner. The converted value and the signal representing the actual output of the generator-motor at an instant are applied to input terminals of a calculation-and-memory device 41 of the control device 40. The device 41 in which a relation between the operating load PG and the output of the generator has been beforehand memorized, calculates an overall output PT of the pump-turbine based on the inputs thereof and the memorized relation. The device 41 further calculates a ratio of the output PL of the low pressure stage to the over-all output PT, and instructs a guide-vane control device 42 to control the guide vanes 12 of the lower pressure stage via a guide-vane servomotor 43 such that the ratio PL/PT thus calculated is brought into a predetermined range (slashed range in FIG. 4), which permits realization of an even head share capable of effecting a high performance of the pump-turbine.

As described above, the movable guide vanes in either one of the high pressure stage and the low pressure stage are controlled in accordance with the output of a generator-motor coupled with the pump-turbine while the guide vanes in the other one of the high pressure stage and the low pressure stage are controlled in accordance with a ratio of the output of the low pressure stage runner detected by the torque meter provided in the intermediate portion of the wheel shaft to the overall output of the pump-turbine calculated from the output of the generator-motor, so that the pump-turbine can be operated satisfactorily under a desired load.

Figure 5:
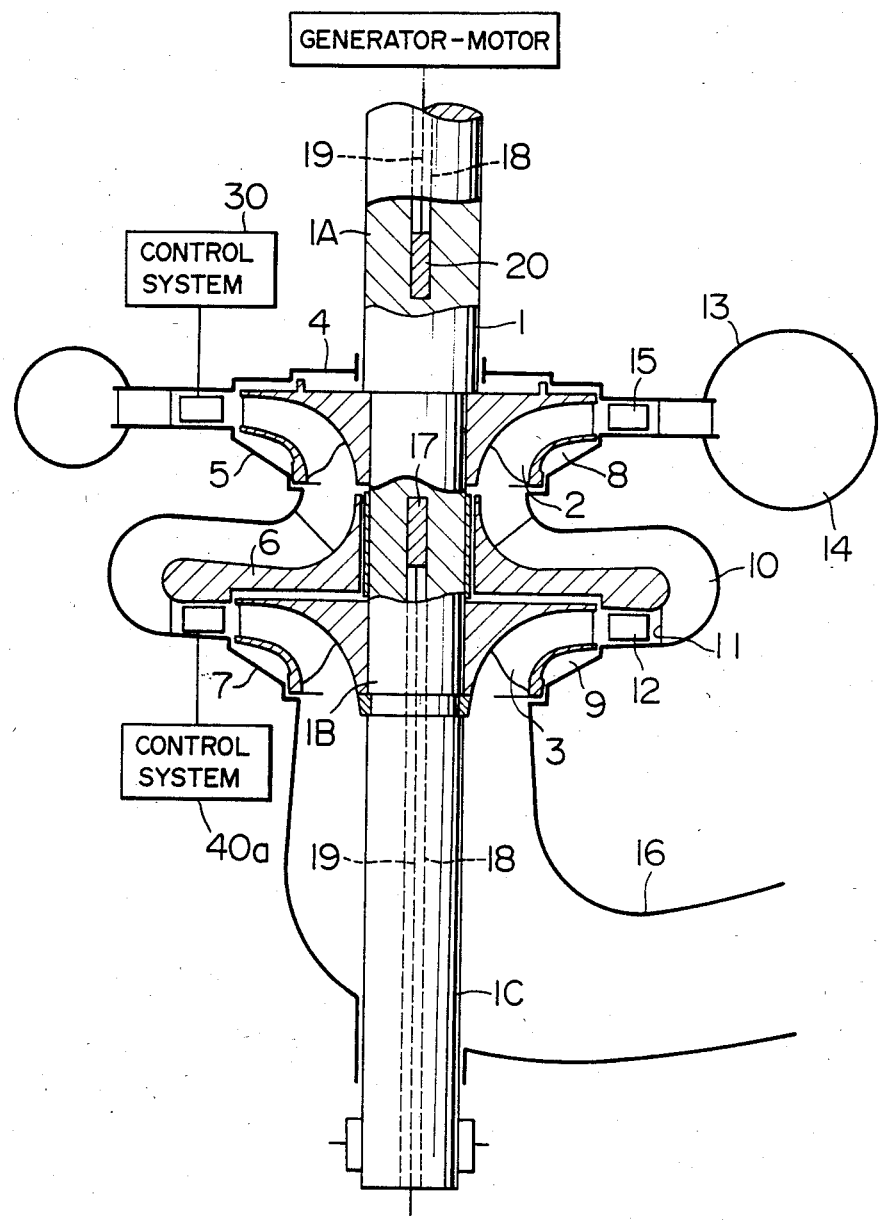
FIG. 5 is a vertical sectional view showing a two stage pump-turbine of Francis type which is controlled in accordance with another embodiment of the invention.

Another embodiment of the invention will be described with reference to FIG. 5 wherein similar members are designated by the reference numerals used with respect to the former embodiment. In this embodiment, another torque meter 20 is provided in the upper portion 1A of the turbine shaft 1, which connects the high pressure stage of the pump-turbine to the generator-motor. The torque meter 20 delivers an output indicative of the over-all output of the pump-turbine directly. In the second embodiment, the movable guide vanes of, for instance, the high pressure stage are controlled by the control device 30 as described above based on the actual output of the generator-motor while the movable guide vanes of, for instance, the low pressure stage are controlled by a control device 40a which is a slight modification of the control device 40 in that the output of the aforementioned torque meter 20 is utilized instead of the actual output of the generator-motor. More specifically, the calculation-and-memory device 41 of the control device 40a calculates the over-all output PT of the pump-turbine and also the ratio of the output PL of the low pressure stage to the over-all output PT and instructs the guide-vane control device 42 to control the guide vanes 12 of the low pressure stage via the guide-vane servomotor 43 such that the ratio PL/PT is brought into the predetermined range shown in FIG. 4.

In the above described embodiments, although the movable guide vanes of, for instance, the lower pressure stage have been controlled such that the ratio PL/PT is brought into the predetermined range, the invention may otherwise be modified such that the device 41 calculates the output PH of the high pressure stage runner by subtracting the output of the low pressure stage runner from the over-all output of the pump-turbine detected by the torque meter 20 and instructs the guide-vane control device 42 such that the ratio of the output PL of the low pressure stage runner to the output PH of the high pressure stage runner or the difference between the outputs PL and PH is brought into a predetermined range.

Figure 6:
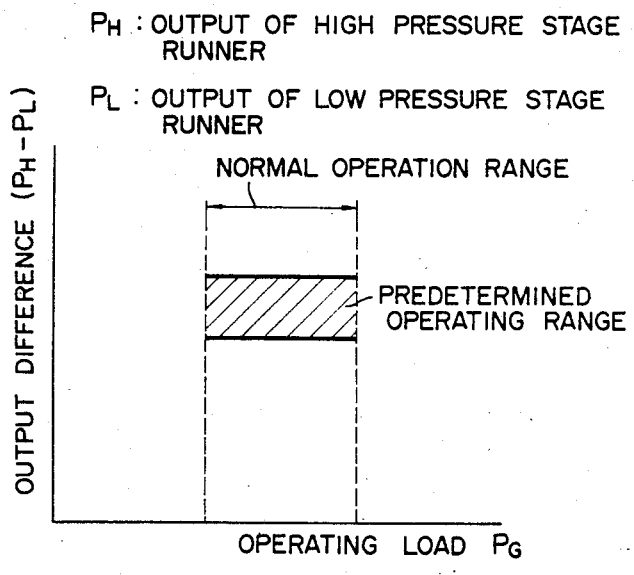
FIG. 6 is a diagram showing another operating range which is defined by a difference between the output of the higher pressure stage and the output of the lower pressure stage in the shown two stage pump-turbine.

FIG. 6. illustrates a relation between the operating load PG and the difference between the high pressure runner output PH and the low pressure runner output PL. According to the modification, the device 41 instructs the guide vane control device 42 such that the difference PH-PL, which is varied in accordance with the variation of the operating load PG, is brought into a predetermined range which ensures an even head share between the respective pressure stages and realizes a high performance of the pump-turbine.

Although in the above described embodiments of the present invention, torque meters 17 and 20 in the form of of strain gauges have been utilized for detecting the output of the low pressure stage runner and the overall output of the pump-turbine, the invention is not necessarily restricted to such types of meters, but may utilize other types of measuring instruments capable of detecting loads of the desired pressure stages. Futhermore, although the invention has been described with respect to a Francis-type two stage pump-turbine, it is apparent that the invention may be applied to multistage hydraulic machines having more than two pressure stages.

What is claimed is:

1. A method of controlling operation of a multistage hydraulic machine for load adjustment under a steady operation condition thereof in which respective pressure stages are connected in series through runners and return passages and the highest and lowest pressure stages are provided with movable guide vanes, the degrees of openings of which being variable, said method comprising the steps of controlling the degree of opening of the movable guide vanes of either one of said highest and lowest pressure stages in accordance with control instructions regarding the load of the hydraulic machine, and controlling the degree of opening of the movable guide vanes of the other one of the highest and lowest pressure stages in accordance with control instructions regarding a relation defined by the load of said lowest pressure stage and the load of the hydraulic machine, said load of the hydraulic machine being detected by a torque meter provided in a portion of a turbine shaft extending on the output side of the highest pressure stage.

2. A method as set forth in claim 1 wherein said relation defined by the load of the lowest pressure stage and the load of the hydraulic machine is a ratio of the load of the lowest pressure stage to the load of the hydraulic machine.

3. A method as set forth in claim 1 wherein said relation defined by the load of the lowest pressure stage and the load of the hydraulic machine is a ratio of the load of the lowest pressure stage to the difference between the load of the lowest pressure stage and the load of the hydraulic machine.

4. A method as set forth in claim 1 wherein said relation defined by the load of the lowest pressure stage and the load of the hydraulic machine is a difference between the load of the lowest pressure stage and the load of the hydraulic machine.

5. A method as set forth in claim 1 wherein said load of the hydraulic machine is detected by a generator-motor directly coupled with the hydraulic machine.

6. A method as set forth in claim 2 wherein the opening of the movable guide vanes of the other one of the highest and lowest pressure stages is controlled such that said ratio of the load of the lowest pressure stage to the load of the hydraulic machine is brought into a predetermined range.

7. A method as set forth in claim 3 wherein the opening of the movable guide vanes of the other one of the highest and lowest pressure stages is controlled such that said ratio of the load of the lowest pressure stage to the difference between the load of the lowest pressure stage and the load of the hydraulic machine is brought into a predetermined range.

8. A method as set forth in claim 4 wherein the opening of the movable guide vanes of the other one of the highest and lowest pressure stages is controlled such that said difference between the load of the lowest pressure stage and the load of the hydraulic machine is brought into a predetermined range.

9. An apparatus for controlling a multistage hydraulic machine under a normal operation condition thereof, in which respective pressure stages are connected in series through runners and return passages, while the highest and lowest pressure stages are provided with movable guide vanes, the degrees of openings of which being variable, the apparatus comprising means for detecting the load of the hydraulic machine, means for detecting the load of the lowest pressure stage, a control device for controlling the movable guide vanes of either one of the highest pressure stage and the lowest pressure stage in accordance with the load of the hydraulic machine, and another control device for controlling the movable guide vanes of the other one of the highest and lowest pressure stages in accordance with a relation defined by the load of said lowest pressure stage and the load of the hydraulic machine, said means for detecting the load of the hydraulic machine being a torque meter provided in a portion of a turbine shaft extending on the output side of the highest pressure stage.

10. An apparatus as set forth in claim 9 wherein said means for detecting the load of the hydraulic machine is a generator-motor directly coupled with the hydraulic machine.

11. An apparatus as set forth in claim 10 wherein said control device for controlling the movable guide vanes of either one of the highest pressure stage and the lowest pressure stage controls the guide vanes in accordance with the difference between the output of the generator-motor and a reference value.

12. An apparatus as set forth in claim 9 wherein said relation defined by the load of the lowest pressure stage and the load of the hydraulic machine is a ratio of the load of the lowest pressure stage to the load of the hydraulic machine.

13. An apparatus as set forth in claim 12 wherein said another control device controls the movable guide vanes of the other one of the highest and lowest pressure stages such that said ratio is brought into a predetermined range.

14. An apparatus as set forth in claim 9 wherein said relation defined by the load of the lowest pressure stage and the load of the hydraulic machine is a ratio of the load of the lowest pressure stage to the difference between the load of the lowest pressure stage and the load of the hydraulic machine.

15. An apparatus as set forth in claim 14 wherein said another control device controls the movable guide vanes of the other one of the highest and lowest pressure stages such that said ratio is brought into a predetermined range.

16. An apparatus as set forth in claim 9 wherein said relation defined by the load of the lowest pressure stage and the load of the hydraulic machine is a difference between the load of the lowest pressure stage and the load of the hydraulic machine.

17. An apparatus as set forth in claim 16 wherein said another control device controls the movable guide vanes of the other one of the highest and lowest pressure stages such that said difference is brought into a predetermined range.

18. A method of controlling operation of a multistage hydraulic machine for load adjustment under a steady operation condition thereof in which respective pressure stages are connected in series through runners and return passages and the highest and lowest pressure stages are provided with movable guide vanes, the degrees of openings of which being variable, said method comprising the steps of controlling the degree of opening of the movable guide vanes of either one of said highest and lowest pressure stages in accordance with control instructions regarding the load of the hydraulic machine, and controlling the degree of opening of the movable guide vanes of the other one of the highest and lowest pressure stages in accordance with control instructions regarding a relation defined by the load of said lowest pressure stage and the load of the hydraulic machine, said load of the lowest pressure stage being detected by a torque meter provided in a portion of a turbine shaft interconnecting the lowest pressure stage with an immediately adjacent pressure stage.

19. A method as set forth in claim 18 wherein said relation defined by the load of the lowest pressure stage and the load of the hydraulic machine is a ratio of the load of the lowest pressure stage to the load of the hydraulic machine.

20. A method as set forth in claim 19 wherein the opening of the movable guide vanes of the other one of the highest and lowest pressure stages is controlled such that said ratio of the load of the lowest pressure stage to the load of the hydraulic machine is brought into a predetermined range.

21. A method as set forth in claim 18 wherein said relation defined by the load of the lowest pressure stage and the load of the hydraulic machine is a ratio of the load of the lowest pressure stage to the difference between the load of the lowest pressure stage and the load of the hydraulic machine.

22. A method as set forth in claim 21 wherein the opening of the movable guide vanes of the other one of the highest and lowest pressure stages is controlled such that said ratio of the load of the lowest pressure stage to the difference between the load of the lowest pressure stage and the load of the hydraulic machine is brought into a predetermined range.

23. A method as set forth in claim 18 wherein said relation defined by the load of the lowest pressure stage and the load of the hydraulic machine is a difference between the load of the lowest pressure stage and the load of the hydraulic machine.

24. A method as set forth in claim 23 wherein the opening of the movable guide vanes of the other one of the highest and lowest pressure stages is controlled such that said difference between the load of the lowest pressure stage and the load of the hydraulic machine is brought into a predetermined range.

25. A method as set forth in claim 18 wherein said load of the hydraulic machine is detected by a generator-motor directly coupled with the hydraulic machine.

26. An apparatus for controlling a multistage hydraulic machine under a normal operation condition thereof, in which respective pressure stages are connected in series through runners and return passages, while the highest and lowest pressure stages are provided with movable guide vanes, the degrees of openings of which being variable, the apparatus comprising means for detecting the load of the hydraulic machine, means for detecting the load of the lowest pressure stage, a control device for controlling the movable guide vanes of either one of the highest pressure stage and the lowest pressure stage in accordance with the load of the hydraulic machine, and another control device for controlling the movable guide vanes of the other one of the highest and lowest pressure stages in accordance with a relation defined by the load of said lowest pressure stage and the load of the hydraulic machine, said means for detecting the load of the lowest pressure stage being a torque meter provided in a portion of a turbine shaft of the hydraulic machine interconnecting the lowest pressure stage with an immediately adjacent stage.

27. An apparatus as set forth in claim 26 wherein said means for detecting the load of the hydraulic machine is a generator-motor directly coupled with the hydraulic machine.

28. An apparatus as set forth in claim 27 wherein said control device for controlling the movable guide vanes of either one of the highest pressure stage and the lowest pressure stage controls the guide vanes in accordance with the difference between the output of the generator-motor and a reference value.

29. An apparatus as set forth in claim 26 wherein said relation defined by the load of the lowest pressure stage and the load of the hydraulic machine is a ratio of the load of the lowest pressure stage to the load of the hydraulic machine.

30. An apparatus as set forth in claim 29 wherein said another control device controls the movable guide vanes of the other one of the highest and lowest pressure stages such that said ratio is brought into a predetermined range.

31. An apparatus as set forth in claim 26 wherein said relation defined by the load of the lowest pressure stage and the load of the hydraulic machine is a ratio of the load of the lowest pressure stage to the difference between the load of the lowest pressure stage and the load of the hydraulic machine.

32. An apparatus as set forth in claim 31 wherein said another control device controls the movable guide vanes of the other one of the highest and lowest pressure stages such that said ratio is brought into a predetermined range.

33. An apparatus as set forth in claim 26 wherein said relation defined by the load of the lowest pressure stage and the load of the hydraulic machine is a difference between the load of the lowest pressure stage and the load of the hydraulic machine.

34. An apparatus as set forth in claim 33 wherein said another control device controls the movable guide vanes of the other one of the highest and lowest pressure stages such that said difference is brought into a predetermined range.

* * * * *